United States Patent
Pranskevichus et al.

(10) Patent No.: US 12,505,503 B2
(45) Date of Patent: Dec. 23, 2025

(54) IMAGE ENHANCEMENT

(71) Applicant: LETS ENHANCE INC, San Francisco, CA (US)

(72) Inventors: Vladyslav Pranskevichus, Kyiv (UA); Dymitr Nowicki, Cracow (PL); Egor Beliaev, Kyiv (UA); Olena Petliak, Kyiv (UA)

(73) Assignee: Lets Enhance Inc, San Francisco, CA (US)

( * ) Notice: Subject to any disclaimer, the term of this patent is extended or adjusted under 35 U.S.C. 154(b) by 514 days.

(21) Appl. No.: 17/999,276

(22) PCT Filed: May 10, 2021

(86) PCT No.: PCT/US2021/031647
§ 371 (c)(1),
(2) Date: Nov. 18, 2022

(87) PCT Pub. No.: WO2021/226601
PCT Pub. Date: Nov. 11, 2021

(65) Prior Publication Data
US 2023/0267583 A1    Aug. 24, 2023

Related U.S. Application Data

(60) Provisional application No. 63/022,424, filed on May 8, 2020.

(51) Int. Cl.
*G06T 3/4046*   (2024.01)
*G06T 3/4053*   (2024.01)
(Continued)

(52) U.S. Cl.
CPC ......... *G06T 3/4046* (2013.01); *G06T 3/4053* (2013.01); *G06T 5/20* (2013.01);
(Continued)

(58) Field of Classification Search
USPC ....................................................... 382/157
See application file for complete search history.

(56) References Cited

U.S. PATENT DOCUMENTS 8,605,945 B2 * 12/2013 El-Maleh ............... G06T 7/174
382/103
10,884,503 B2 * 1/2021 Divakaran ............. G06N 5/022
(Continued)

FOREIGN PATENT DOCUMENTS

CN    109904447 A       6/2019
CN    111260545 B   *   6/2023    ......... G06K 9/00221

OTHER PUBLICATIONS

Zhang et al. (Zhang, Xinyu et al. "Dual discriminator Gan: a Gan way of profile face recognition". Mar. 20, 2020. arXiv: 2003.09116 https://doi.org/10.48550/arXiv.2003.09116) (Year: 2020).*
(Continued)

*Primary Examiner* — Chineyere Wills-Burns
*Assistant Examiner* — Aaron Timothy Bonansinga
(74) *Attorney, Agent, or Firm* — Ahmann Kloke LLP

(57) ABSTRACT

A system for automated image enhancement using artificial intelligence is disclosed. Generative adversarial networks can be used to generate new details and restore features of an image. In a specific implementation, a neural net removes artifacts and upscales images end-to-end, and auxiliary networks like HDR improve colors, white balance, etc.

20 Claims, 3 Drawing Sheets

(51) Int. Cl.
*G06T 5/20* (2006.01)
*G06T 5/50* (2006.01)
*G06T 5/60* (2024.01)
*G06T 5/70* (2024.01)
*G06T 5/73* (2024.01)
*G06T 5/77* (2024.01)
*G06T 7/00* (2017.01)
*G06V 10/774* (2022.01)
*G06V 10/82* (2022.01)
*G06V 40/16* (2022.01)

(52) U.S. Cl.
CPC ............... *G06T 5/50* (2013.01); *G06T 5/60* (2024.01); *G06T 5/70* (2024.01); *G06T 5/73* (2024.01); *G06T 5/77* (2024.01); *G06T 7/0002* (2013.01); *G06V 10/774* (2022.01); *G06V 10/82* (2022.01); *G06V 40/16* (2022.01); *G06V 40/172* (2022.01); *G06T 2207/20081* (2013.01); *G06T 2207/20084* (2013.01); *G06T 2207/20221* (2013.01); *G06T 2207/30168* (2013.01); *G06T 2207/30201* (2013.01)

(56) References Cited

U.S. PATENT DOCUMENTS

| | | | | |
|---|---|---|---|---|
| 11,200,643 | B2* | 12/2021 | Kokura | G06T 5/73 |
| 2002/0036783 | A1* | 3/2002 | Yoshidome | H04N 1/52 |
| | | | | 358/1.9 |
| 2002/0146178 | A1 | 10/2002 | Bolle et al. | |
| 2009/0256926 | A1* | 10/2009 | Okada | G06V 10/96 |
| | | | | 348/222.1 |
| 2011/0044512 | A1* | 2/2011 | Bambha | G06F 16/58 |
| | | | | 345/620 |
| 2012/0189168 | A1* | 7/2012 | El-Maleh | G06T 7/174 |
| | | | | 382/107 |
| 2012/0307116 | A1* | 12/2012 | Lansel | H04N 23/843 |
| | | | | 348/E9.005 |
| 2013/0022287 | A1 | 1/2013 | Hooper | |
| 2016/0330369 | A1* | 11/2016 | Corcoran | G06T 7/248 |
| 2017/0132760 | A1 | 5/2017 | Kothule et al. | |
| 2017/0132763 | A1 | 5/2017 | Marcos et al. | |
| 2017/0160813 | A1* | 6/2017 | Divakaran | G10L 15/22 |
| 2017/0185871 | A1 | 6/2017 | Zhang et al. | |
| 2017/0352135 | A1* | 12/2017 | Florea | G06T 7/181 |
| 2019/0042828 | A1* | 2/2019 | Solanki | A61B 3/12 |
| 2019/0052911 | A1* | 2/2019 | Zhang | H04N 19/136 |
| 2019/0145765 | A1* | 5/2019 | Luo | G06V 10/764 |
| | | | | 702/153 |
| 2019/0197670 | A1* | 6/2019 | Ferrer | G06V 10/764 |
| 2019/0207209 | A1 | 7/2019 | Venkatachalam et al. | |
| 2019/0287283 | A1* | 9/2019 | Lin | G06T 5/60 |
| 2019/0347516 | A1* | 11/2019 | Krupka | G06F 16/5854 |
| 2020/0175374 | A1* | 6/2020 | Hestness | G06N 3/084 |
| 2020/0202496 | A1* | 6/2020 | Kokura | G06T 15/20 |
| 2020/0356810 | A1* | 11/2020 | Zhong | G06N 3/084 |
| 2020/0357096 | A1* | 11/2020 | Gao | G06T 5/70 |
| 2021/0256254 | A1* | 8/2021 | Takahashi | G06F 18/22 |
| 2021/0304357 | A1* | 9/2021 | Bae | H04N 19/59 |
| 2021/0334644 | A1* | 10/2021 | Yu | G06N 3/045 |
| 2022/0414849 | A1* | 12/2022 | Wang | G06T 3/4053 |

OTHER PUBLICATIONS

International Search Report and Written Opinion for related International Application No. PCT/US2021/031647, mailed Aug. 16, 2021 (6 Pages).

Lv et al. "Attention guided Low-light Image Enhancement with a Large Scale Low-light Simulation Dataset", arXiv:1908.00682v3 [eess.IV] Mar. 15, 2020. Retrieved on Jul. 20, 2021.

Ni et al. "Unpaired Image Enhancement with Quality-Attention Generative Adversarial Network", Poster Session C1: Deep Learning for Multimedia MM'20, Oct. 16, 2020. Retrieved on Jul. 20, 2021.

* cited by examiner

IMAGE ENHANCEMENT

CROSS-REFERENCE TO RELATED APPLICATIONS

This application is a national phase application pursuant to 35 U.S.C. § 371 of International Application No. PCT/US2021/031647, entitled "IMAGE ENHANCEMENT", filed on May 10, 2021, which claims benefit of U.S. Provisional Application No. 63/022,424, entitled "IMAGE ENHANCEMENT", filed on May 8, 2020, which is incorporated herein by reference in its entirety.

BACKGROUND

Image enhancement is an area of ongoing research and development. Image enhancement is valuable but expensive and mostly manual. By some accounts, products with high quality photography sell 32% faster. By some accounts, 92% of consumers are driven to a purchasing decision based on product imagery. Currently, high end image enhancement typically costs around $10.00 per picture.

Zillow, Booking.com, and other enterprises that present high-value products to potential consumers re-use a great deal of content from previous years. Enterprises present hundreds of thousands of images and, for high-end products, it is generally desirable to obtain a high-quality image even at relatively high cost. If a readily available image cannot be adequately enhanced, more expensive alternatives may be pursued.

Images frequently have exposure issues, lighting issues, or could benefit from enhancement for some other reason. Instagram, WhatsApp, and other applications that handle massive numbers of online images heavily compress the images. Low-quality e-commerce imagery fails to produce high end results. When a photo is compressed, photo quality and details are lost.

In such an environment, any improvement to image enhancement techniques (reduced cost, higher speed, higher quality end results, etc.) would be considered advantageous.

SUMMARY

The expensive, slow, manual job of image enhancement is automated using artificial intelligence (AI). Generative adversarial networks can be used to generate new details and restore features of an image. In a specific implementation, a neural net removes artifacts and upscales image end-to-end, and auxiliary networks like HDR improve colors, white balance, etc.

Advantageously, images have an average processing time of less than a second per image. The advantages can be exploited for still images as well as video processing (e.g., 1080p to 8K UHD and 30 fps to 60 fps or 120 fps). An image enhancement engine can be integrated into an application programming interface (API) as a cloud-based API and software development kit (SDK). Colors can be changed according to a customized brand style guide. The advantages are scalable with excellent B2B opportunities.

DETAILED DESCRIPTION

Figure 1:
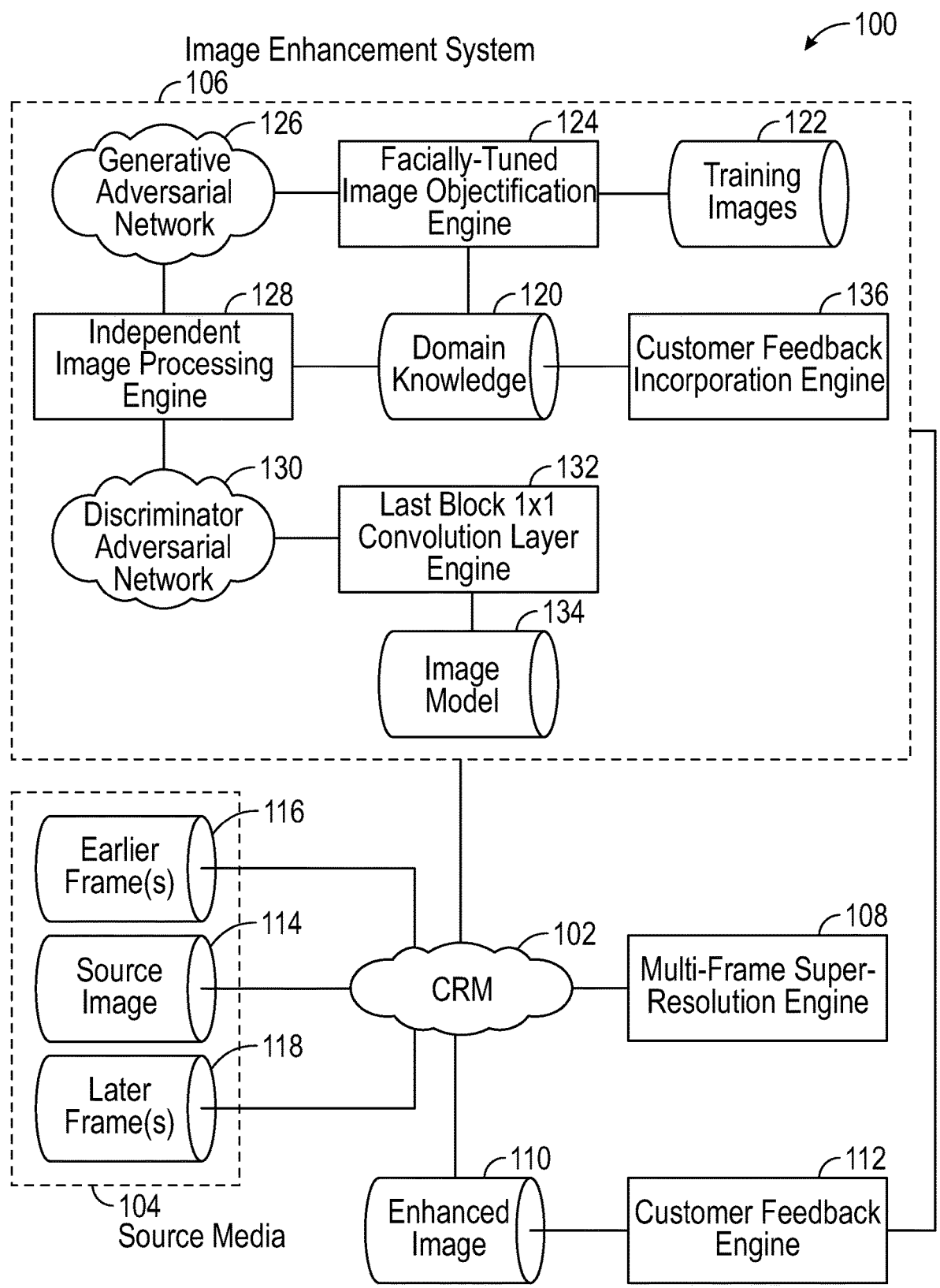
FIG. 1 is a diagram of an example of a system for image enhancement.

FIG. 1 is a diagram 100 of an example of a system for image enhancement. In a specific implementation, the system facilitates the redrawing of a source image in a photorealistic manner with improved resolution or texture. Advantageously, to the extent a source image is "stretched" for upscaling purposes, new information is added to the image based upon knowledge learned by training a machine and/or understanding how an image is compressed; it is known that jpeg destroys information simply by storing an image in the format. In addition to the general image restoration algorithm, in a specific implementation, new faces are created from an image-degraded face in a source image by using a specially trained version of the upscaling network.

The diagram 100 includes a computer-readable medium (CRM) 102, a source media datastore 104 coupled to the CRM 102, an image enhancement system 106 coupled to the CRM 102, a multi-frame super-resolution engine 108 coupled to the CRM 102, an enhanced image datastore 110, and a customer feedback engine 112 coupled to the enhanced image datastore 110. The source media datastore 104 includes a source image datastore 114, an earlier source frame(s) datastore 116, and a later source frame(s) datastore 118. The image enhancement system 106 includes a domain knowledge datastore 120, a training images datastore 122, a facially-tuned image objectification engine 124, a generative adversarial network 126, an independent image processing engine 128, discriminator adversarial networks 130, a last block 1×1 convolutional layer engine 132, and an image model datastore 134. The 1×1 convolutions are used to expand 3 channels of RGB image into much larger quantity of channels for super-resolved image. For example, for 4× upscale we get 48 channels what are then reshaped into 4×4*3 blocks. Interfaces for communicating across networks and CRMs are omitted from the figure to avoid clutter but are assumed where applicable to facilitate a coupling of components.

The CRM 102 may comprise a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM), static RAM (SRAM), and GPU RAM. The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Referring once again to the example of FIG. 1, the source media datastore 104 is intended to represent media provided by a source media provider. As used in this paper, source media is a set of (potentially multimedia) images that is used to create an enhanced image. Source media that comprises a single image can be referred to as a source image; source media that comprises multiple sequentially ordered images can be referred to as a video comprising multiple sequentially ordered frames (images). An enhanced image can be part of multiple sequentially ordered enhanced frames but for illustrative purposes techniques described below primarily describe a single enhanced image, which may or may not be an enhanced frame that is part of an enhanced video.

The source image datastore 114 is intended to represent a portion of the source media datastore 104 that includes an image that has been targeted for enhancement. Although multiple frames (images) and multimedia can comprise source media, the source media datastore 104 includes, at a minimum, the source image datastore 114. In a specific implementation, the source image datastore 114 includes a "dirty" image, which can be characterized as blurred, incorporating noise (including artistic noise), suffering from compression-related damage, or other destructive characteristics.

The earlier source frame(s) datastore 116 and the later source frame(s) datastore 118 are optional in the sense they are only applicable for source video. To the extent reference is made to the earlier source frame(s) datastore 116 or the later source frame(s) datastore 118 it should be recognized such reference is predicated on the assumption the datastores are applicable. Advantageously, the image enhancement system 106 can look a few frames ahead and behind to enhance frame optical flow. As discussed below, objectification will also result in identifying objects in motion, as opposed to just a sequence of images considered independently of one another.

Instead or in addition, the source media datastore 104 includes a related source images datastore, not shown, which includes images similar to the source image (or a target enhanced image), though this could also be considered part of the source image datastore 114 to the extent the related source images are incorporated into an enhanced image. For example, face similarity could be incorporated into the training process to combine an image of a first person with other images of the first person. In a specific implementation, the image enhancement system 106 could maintain a high resolution image of a person and, when the person is tagged in a photo, use the high resolution image to improve photorealism of the person when an image is enhanced.

The image enhancement system 106 is intended to represent engines and datastores used to convert source media into at least one enhanced image. The image enhancement system 106 can be implemented as an API incorporated into a consumer product that, at least in part, enhances images, as a cloud-based application, or in some other applicable manner. In a specific implementation, the image enhancement system 106 trains a network to recognize undesirable images and filter out of dataset.

"Resdet" stands for rescale/resize and blur detection and estimation. Resdet is an algorithm used to detect an upscaling factor that was applied to the image previously making it blurry. Knowing the previous upscaling factor, we may reverse this transformation and obtain a lower-resolution sharper image which will yield much better enhancement result after our main algorithm. This approach is quite unique and allows us to successfully enhance much larger percentage of images.

In a specific implementation, resdet includes an analytical algorithm based on the Fourier spectral analysis to estimate the factor of rescale or magnitude of blur. The blur magnitude is defined as a radius of the kernel that is needed to obtain blurred image from the sharp one. A neural network is trained on pairs of original image and a downscaled image is upscaled to original size with an algorithm such as Lanczos, bicubic, or the like. The image is blurred via convolution with kernel monotonically decreasing along distance of its center (so-called "star kernels").

It may be noted images that are too blurry or already upscaled by different methods are excluded. Also, in a specific implementation, images with faces undergo special treatment (e.g., face fix).

The domain knowledge datastore 120 includes data associated with image enhancement. Image enhancement can include resizing, improving quality to ratio of choice (e.g., 16x), improving colors via object analysis and painting, improving textures, or the like. Advantageously, super-resolution with photorealistic results is possible. Domain knowledge is utilized by various components, including the facially-tuned image objectification engine 124, the independent image processing engine 128 (as well as the adversarial networks but access to the networks is conceptually treated as via the independent image processing engine 128, which is coupled to the networks), and is updated by results and, if applicable, the customer feedback incorporation engine 136.

The training images datastore 122 includes images used to train a machine (as part of a machine learning process), which may or may not include images from the source media datastore 104. In a specific implementation, batches of images of uniform size comprise at least a subset of the training images in the training images datastore 122. Instead or in addition, different-sized images are used for gradient accumulation during training. In a specific implementation, 50-90% of a subset of images is occupied by one or more faces (leaving 10-50% of the image including non-face objects) and faces are randomly (or pseudo-randomly) moved and accessorized. In a specific implementation designed with the task of image printers in mind, recognizing jpeg has a quality factor (1-100), images with a quality factor of 30-50 and 50-80 are used for training. A reason for omitting 80+ quality factor is a machine may not try to clean images of 80+ quality and at below 30, image quality is too low to provide optimal training. It should be recognized modifications to the technology could make higher and lower quality factors useful. However, advantageously, it has been found generalization works well to enable upscaling of clean images (even those with an 80+ quality factor) after training a machine in this manner.

The facially tuned image objectification engine 124 is intended to represent an engine that identifies objects within an image (the image itself can also be treated as an object) with an emphasis on faces. A trick in objectification of objects in an image is to fight, e.g., jpeg compression effects. For example, blocks can be randomly emulated to force a neural network to try to fill them in; blocks randomly destroyed with noise need to be fixed. Surrounding context of an image can be used for this purpose and knowledge can be accumulated, which can be stored in the domain knowledge datastore. In a specific implementation, a distribution data set is skewed toward smaller faces (in terms of pixels), with 20-300 pixels in linear size (although an effort to upscale faces of 10 pixels or less is attempted with lower probability of success); at 300 pixels or more, upscaling can be accomplished by treating faces as textures. Faces of less than 150 pixels are restored with a special algorithm, faces of 150-300 pixels are upscaled with training, and faces of 300+ pixels are safe for upscaling with textures (no special training necessary). Small faces are later blended into upscaled images.

In a specific implementation, the blending is done as follows: There is an area of blending that form a "rectangular ring" next to the border of the inpainted image. Inside the "ring" the inpainted and outer images are blended linearly with coefficients computed using sine function to make smooth seamless blending. An inner area of the "ring" consists only of an inpainted image, and outside the "ring" we have only an outer one.

Figure 2:
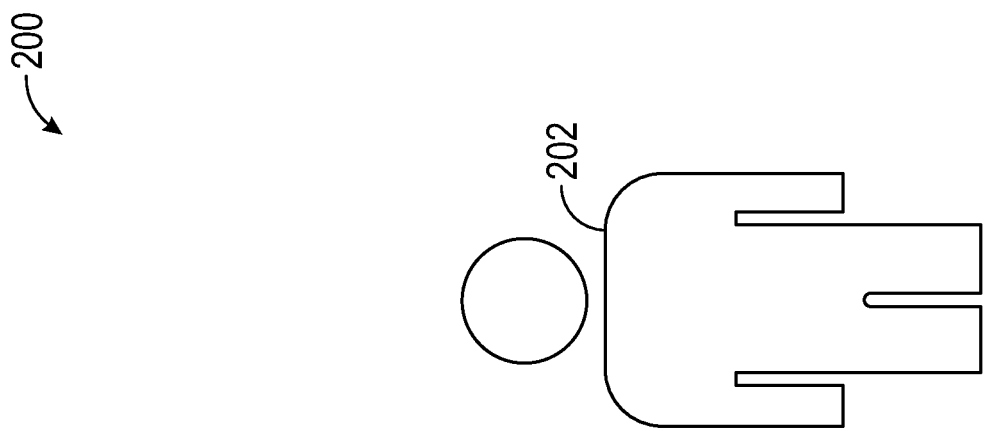
FIG. 2 is a diagram of an objectified image.
Figure 2:
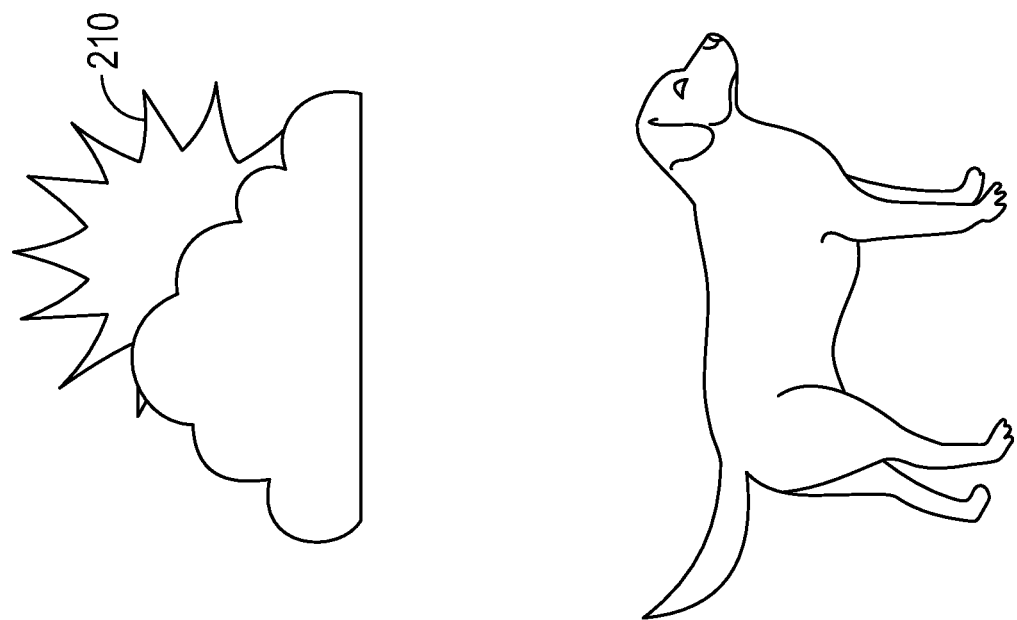

FIG. 2 is a diagram 200 of an objectified image. The diagram 200 is simplified for illustrative purposes. A person object 202 in the objectified image can be characterized as an object but in a specific implementation, the person is broken into multiple different objects, including a face object 204. Other objects, such as an article of clothing 206 can also be objectified. Objects deemed to be less important for the purpose of image enhancement, such as a dog 208, may or may not be objectified. Similarly, background images, such as a sun and cloud 210, may or may not be objectified. In a specific implementation, those objects deemed sufficiently important, such as the face 204, are "cut out" of an image and processed separately. The facially tuned image objectification engine 124 is responsible for the former (i.e., objectifying the image into separate processing objects) and at least the independent image processing engine 128 is responsible for the latter (i.e., processing image objects independently).

It has been found knowing what is in "front" is important for image enhancement. For example, knowledge that glasses are in front of a face is valuable domain knowledge. When processing objects independently, it should be understood the objects can have subobjects that are instead or in addition processed separately. For example, a face object could be independently processed, a glasses object could be independently processed, and/or the face object with glasses on could be independently processed. This knowledge can also assist in modifying images, such as to remove, change, or add glasses to a face.

Referring once again to the example of FIG. 1, the generative adversarial network 126 is intended to represent a generative adversarial network that is used in conjunction with, and temporally in advance of, a discriminator adversarial network. The independent image processing engine 128 is intended to represent an engine that processes a source image into an enhanced image.

The discriminator adversarial networks 130 is intended to represent multiple discriminator adversarial networks, which may include a Visual Geometry Group (VGG) discriminator, that are used in conjunction with, and temporally following, a generative adversarial network. In a specific implementation, the discriminator adversarial networks 130 are only used during training for a fully connected layer of fixed size. In a specific implementation, at least one of the discriminator adversarial networks 130 is associated with human facial structure and at least one is associated with textures (e.g., mustaches, skin, textiles, and other learned properties).

The last block 1×1 convolutional layer engine 132 is intended to represent a 1×1 convolutional layer engine that is applied at the end of an image enhancement process. In a specific implementation, multiple (e.g., 1024) 1×1 convolution layers in the last block but the last block is usually a fully connected layer. This technique is desirable if there are a variety of block sizes, which is expected in some implementation.

The image model datastore 134 is intended to represent a datastore that includes an image model that is the result of an image enhancement process.

The multi-frame super-resolution engine 108 is intended to represent an engine that uses the image model from the image model datastore 134 to enhance the source image from the source image datastore 114. Multi-frame super-resolution entails merging multiple images. In a specific implementation, the multi-frame super-resolution engine 108 merges multiple frames to improve resolution of an image sans access to a source image with the target resolution. Advantageously, the multi-frame super-resolution engine 108 uses the results of a pre-existing source image, not improving a photo at the time a photograph (or other captured image) is taken, so the process can be used after the photographing opportunity has passed.

It may be noted image enhancement involves a process rather like training and, indeed, a source image can be used as a training image. To the extent an image model is used by a party that does not provide a source image to an image enhancement system that is also responsible for training a model, the image enhancement system 106 and the multi-frame super-resolution engine 108 can be owned by different parties. In such an implementation, the image model datastore 134 would provide sufficient data to the multi-frame super-resolution engine 108 to enable image enhancement as described in this paper. To the extent the training and image enhancement are accomplished by a single entity, the multi-frame super-resolution engine 108 can be considered part of the image enhancement system 106.

The enhanced image datastore 110 is intended to represent output from engines that convert the source image of the source image datastore 114 to an enhanced image. In a specific implementation, the enhanced image is retained in temporary storage so as to avoid maintaining the images of customers (unless desired). Encryption keys can be used to keep images private.

The customer feedback engine 112 is intended to represent an engine for providing feedback from a consumer of the enhanced image (who may or may not be a provider of the source image, who may or may not also provide feedback, if different). The feedback can be used to improve domain knowledge. In a specific implementation, the feedback is used to improve the enhanced image about which feedback is provided. In an alternative, the feedback is used to modify domain knowledge for future image processing for the provider of the feedback. In an alternative, the feedback is used to modify domain knowledge for future image processing for other than the provider of the feedback.

In an example of a specific use case, a printer has access to only compressed images, such as is typical for image sharing platforms. The printer can use the engines and datastores described with reference to FIG. 1 to obtain relatively high-resolution images from the relatively low-resolution source image.

In an alternative, images can be enhanced to make a person "look better." This can be accomplished by training a machine to upscale and modify images toward what is deemed to be more attractive. For example, people in images can be made to look younger, slimmer, or the like. Moreover, a smaller number of images can be retained by, for example, a marketing entity, that has the ability to change characteristics of a photo, such as makeup, skin color, facial hair, hair style, or the like, as is deemed suitable for a particular market. Objects can also be added, such as jewelry and clothing.

In an alternative that has less of a facial focus, marketplaces with a library of images may wish to standardize images. For example, a real estate agency may want to adjust lighting, shadow, angles, or the like in physical structures.

In an alternative, the technology can be used for optical character recognition (OCR). For example, fonts could be included in a data set to improve character recognition accuracy using a generative adversarial network. In a specific implementation, the system custom-makes a font based upon a handwriting sample.

Figure 3:
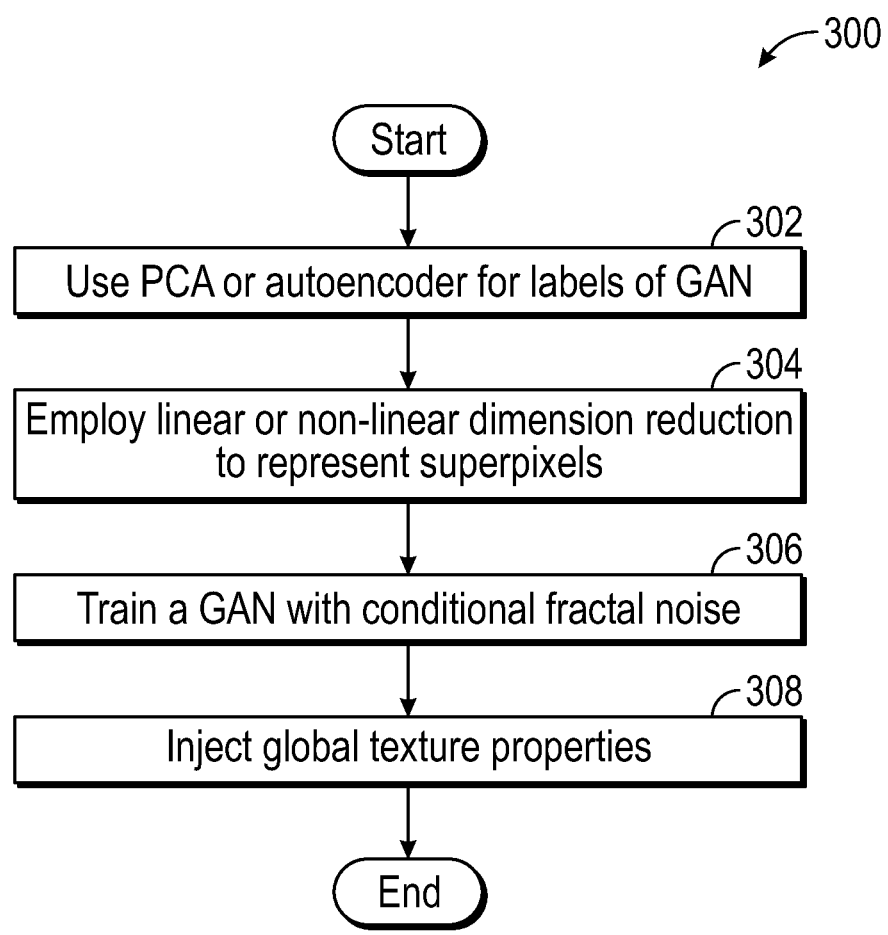
FIG. 3 is a flowchart of an example of an example of a method for generative adversarial network (GAN) training.

FIG. 3 is a flowchart 300 of an example of an example of a method for generative adversarial network (GAN) training. The flowchart 300 starts at module 302 with using principal component analysis (PCA) or autoencoder for labels of a GAN. An image objectification engine, such as the facially tuned image objectification engine 124 of FIG. 1, is suitable for carrying out module 302. (FIG. 1 also illustrates an applicable GAN 126.)

The flowchart 300 continues to module 304 with employing linear or nonlinear dimension reduction to represent superpixels. An example of a tool used for linear dimension reduction is PCA. An example of a tool used for nonlinear dimension reduction is umap autoencoders. Superpixels correspond to low resolution pixels of a source image. Advantageously, the dimension reduction reduces capacity of target space and facilitates GAN training. An image objectification engine, such as the facially tuned image objectification engine 124 of FIG. 1, is suitable for carrying out module 304.

The flowchart 300 continues to module 306 with using conditional fractal noise to train the GAN. Examples of conditional fractal noise include 2D "pink" noise and fractal Brownian motion. Advantageously, when simple white noise is introduced, the GAN tends to ignore it but by introducing conditional fractal noise, the GAN is substantially more likely to not ignore it. Also, fractal noise that reproduces some properties of underlying texture (such as amplitude and scaling) teaches the GAN to reproduce small texture details more accurately. An independent image processing engine, such as the independent image processing engine 128 of FIG. 1, is suitable for carrying out module 306.

The flowchart 300 continues to module 308 with injecting global texture properties. In a specific implementation, an image is divided into small slices (e.g., 32*32) and a slice encoder builds embeddings of them. In this implementation, the slice encoder is fed low-resolution versions of slices and it trains to reproduce high resolution ones. Adding the encodings of such a network to the GAN gives it clues to the context dependent texture features and serves as implicit "index" of textures. Advantageously, in this way, the GAN can pain meaningful details in an upscaled texture. An independent image processing engine, such as the independent image processing engine 128 of FIG. 1, is suitable for carrying out module 308.

Resdet is an algorithm used to detect an upscaling factor that was applied to the image previously making it blurry. Knowing the previous upscaling factor, we may reverse this transformation and obtain a lower-resolution sharper image which will yield much better enhancement result after our main algorithm. This approach is quite unique and allows us to successfully enhance much larger percentage of images.

The invention claimed is:

1. A system comprising:
   a training images datastore that includes training images used to train a neural network as part of a machine-learning process to recognize undesirable images, wherein 50% to 90% of a subset of the training images is occupied by one or more faces and the one or more faces are pseudo-randomly moved and accessorized;
   a domain knowledge datastore that includes domain knowledge associated with image enhancement and generated, at least in part, from the machine-learning process;
   a facially-tuned image objectification engine, coupled to the training images datastore and the domain knowledge datastore, that uses the domain knowledge, wherein the facially-tuned image objectification engine is configured to objectify a source image into separate processing objects with an emphasis on faces as part of an image enhancement process;
   an independent image processing engine, coupled to the facially-tuned image objectification engine, that uses the domain knowledge, wherein the independent image processing engine processes the separate processing objects independently to generate an enhanced image from the source image;
   a last block 1×1 convolutional layer engine, coupled to the independent image processing engine, that is applied at an end of an image enhancement process;
   an image model datastore, coupled to the last block 1×1 convolutional layer engine, configured to include an image model that is a result of the image enhancement process.

2. The system of claim 1, comprising a source media datastore with a source image datastore that includes the source image targeted for enhancement as part of the image enhancement process, wherein the source image includes defects selected from a group consisting of blurring, noise, compression-related damage, destructive characteristics, and a combination of these.

3. The system of claim 2, wherein the source media datastore includes an earlier source frame datastore and a later source frame datastore and wherein the source media datastore includes a sequence of source images, including the source image, an earlier source frame from the earlier source frame datastore, and a later source frame from the later source frame datastore.

4. The system of claim 2, wherein the source media datastore includes a related source images datastore that includes images similar to the source image or a target enhanced image.

5. The system of claim 2, wherein the source media datastore includes a high resolution image of a person, wherein, when the person is tagged so as to indicate association with the source image, the high resolution image of the person can be used to improve photorealism of the person when the source image is enhanced.

6. The system of claim 1, wherein an upscaling factor that was applied to the source image is detected, making the upscaling factor a detected upscaling factor, and the detected upscaling factor is used to reverse a transformation and obtain a sharp image for enhancement, wherein the sharp image is lower-resolution than the source image, and which, once obtained, replaces the source image during the image enhancement process.

7. The system of claim 1, comprising a subengine that includes, incorporated therein, an analytical algorithm based on Fourier spectral analysis to estimate factor of rescale.

8. The system of claim 1, comprising a subengine that includes, incorporated therein, an analytical algorithm based on Fourier spectral analysis to estimate magnitude of blur defined as a radius of kernel for obtaining a blurred image from a sharp image.

9. The system of claim 1, wherein the source image is blurred via convolution with kernel monotonically decreasing along distance at a center of the image.

10. The system of claim 1, wherein image enhancement includes an enhancement selected from a group consisting of resizing, improving quality to ratio of choice, improving colors via object analysis, improving textures, and a combination of these.

11. The system of claim 1, wherein at least a subset of the training images are training images of uniform size and wherein different-sized training images are used for gradient accumulation during training.

12. The system of claim 1, wherein images with a quality factor of 30-50 and 50-80 are used for training.

13. The system of claim 1, wherein the facially-tuned image objectification engine emulates blocks to force a neural network to try to fill in a block using surrounding context of the source image.

14. The system of claim 1, wherein an area of blending forms a rectangular ring next to a border of an inpainted image, and the inpainted and outer images are blended linearly to make smooth seamless blending.

15. The system of claim 1, wherein the separate processing objects include multiple different objects associated with a person in the source image, including a face object associated with the person and an accessory object associated with the person, and wherein the independent image processing engine processes the face object independently, the accessory object independently, and a composite face object and accessory object independently.

16. The system of claim 1, comprising:
a generative adversarial network coupled to the facially-tuned image objectification engine and the independent image processing engine;
a first discriminator adversarial network associated with human facial structure, coupled to the independent image processing engine and the last block 1×1 convolution layer engine, that is used during training for a fully connected layer of fixed size in conjunction with and temporally following the generative adversarial network;
a second discriminator adversarial network associated with textures, coupled to the independent image processing engine and the last block 1×1 convolution layer engine, that is used during training for a fully connected layer of fixed size in conjunction with and temporally following the generative adversarial network.

17. The system of claim 1, comprising a multi-frame super-resolution engine, coupled to the image enhancement system, that uses the image model from the image model datastore to enhance the source image from a source image datastore, wherein the multi-frame super-resolution engine merges multiple frames to improve resolution of the source image when the source image lacks a target resolution.

18. The system of claim 1, comprising an enhanced image datastore configured to receive output from the image enhancement process in the form of an enhanced image.

19. The system of claim 18, comprising a customer feedback engine for providing feedback from a consumer of the enhanced image, wherein the feedback is used to modify domain knowledge for future image processing.

20. A system comprising:
a training images datastore that includes training images used to train a neural network as part of a machine-learning process to recognize undesirable images, wherein the training images used for training have a quality factor of 30-50 and 50-80;
a domain knowledge datastore that includes domain knowledge associated with image enhancement and generated, at least in part, from the machine-learning process;
a facially-tuned image objectification engine, coupled to the training images datastore and the domain knowledge datastore, that uses the domain knowledge, wherein the facially-tuned image objectification engine is configured to objectify a source image into separate processing objects with an emphasis on faces as part of an image enhancement process;
an independent image processing engine, coupled to the facially-tuned image objectification engine, that uses the domain knowledge, wherein the independent image processing engine processes the separate processing objects independently to generate an enhanced image from the source image;
a last block 1×1 convolutional layer engine, coupled to the independent image processing engine, that is applied at an end of an image enhancement process;
an image model datastore, coupled to the last block 1×1 convolutional layer engine, configured to include an image model that is a result of the image enhancement process.

* * * * *